March 3, 1942.   R. BECKER   2,274,819
CLOSURE
Filed July 19, 1939
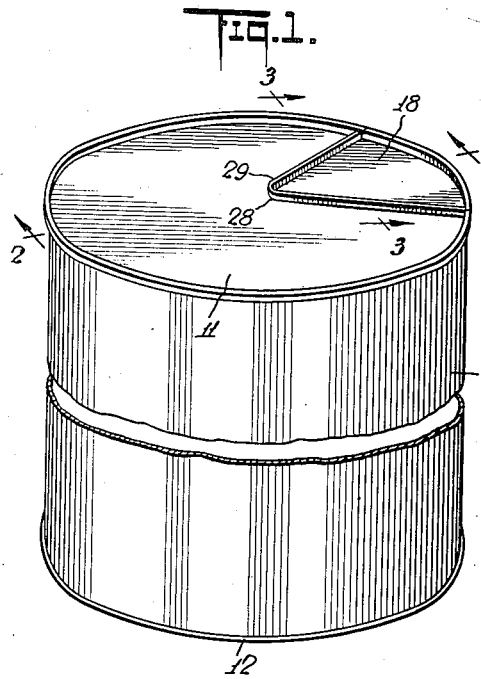
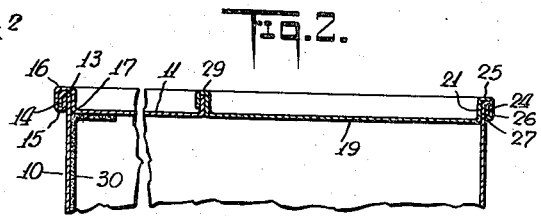
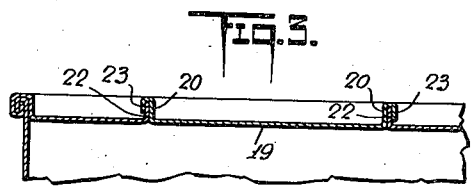
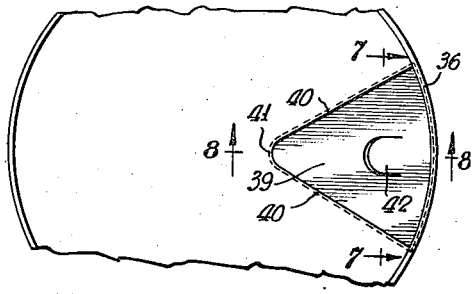
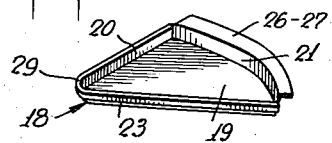
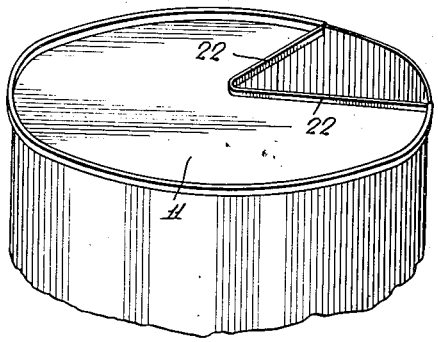
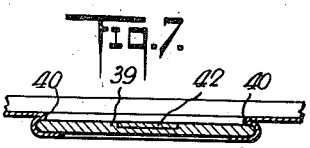
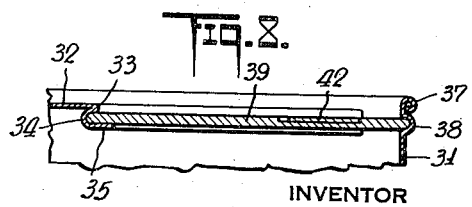
INVENTOR
Rebecca Becker
BY
ATTORNEY Patented Mar. 3, 1942

2,274,819

UNITED STATES PATENT OFFICE 2,274,819

CLOSURE

Rebecca Becker, New York, N. Y.

Application July 19, 1939, Serial No. 285,347

2 Claims. (Cl. 220—24)

The present invention relates to a closure to be used in canning whole milk.

Milk as now ordinarily distributed requires the use of rather heavy, thick and expensive glass bottles, which not only necessitate the handling of excessive weight but also cause substantial capital outlay, expenditure and loss to milk companies supplying milk for small scale consumption.

Paraffin paper bottles have not proved to be particularly satisfactory for the distribution and dispensation of whole milk because they do not withstand handling and variation in temperature and also because of the fact they do not tend to preserve the milk from air, oxidation and other deterioration.

In my prior application Serial No. 185,151, filed January 15, 1938, I have disclosed a can construction for the storage, dispensation and distribution of whole milk to homes, retail stores and so forth, which container will be readily handled, shipped, stored and delivered and which, at the same time, will not cause any change in taste or quality of the milk, and also may be readily opened by the housewife, domestic or consumer to permit dispensation and consumption of the milk.

It is among the objects of the present invention to provide an improved can construction for processing and carrying whole milk and at the same time provide an improved procedure for canning milk.

Another object of the present invention is to provide an inexpensive can construction in which the milk may be placed and from which the milk may be readily removed without the necessity of using any expensive cover attachments and without the necessity of using any special can opener constructions.

A further object is to provide an improved can construction in which the milk may be maintained wholesome and fresh over substantially longer periods of time than is now possible with ordinary methods of canning and merchandising milk.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the objects of the above invention, it has been found most satisfactory to form the can top in such a way that a sheet- like and preferably a removable metal, paper or plastic cover element might be inserted in the top of the can and be readily removed prior to consumption or dispensing of the milk.

Although it is possible to provide a central opening in the can top to receive a paper or laminated disk, it has been found most satisfactory to form an opening in the form of a wedge or triangle or even rectangle or possibly even in the form of a chordal area adjacent one of the edges of the top of the can so that it will not be necessary to pour the milk over the can edge.

In the preferred construction, according to the present invention, the top of the can is provided with a depending flange having a ridge in which the metal, paper or laminated insert may be placed.

If desired, the depending flange may also be so formed and shaped as to cooperate with a temporary lid or closure of paper or even metal in case the entire contents of the can have not been consumed.

The can may be so constructed as to have a slight super or sub-atmospheric pressure, preferably of a non-oxygen containing gas, such as nitrogen or carbon dioxide, and it has been found desirable for packaging the can to exhaust the air from the milk and this may be done by successive applications of vacuum during or following the pasteurization process.

Although the milk may be pasteurized at varying temperatures from 125 up to 175° F., it has been found most satisfactory to use a shorter pasteurization period and at a higher temperature which may even be carried out in connection with the canning operation and as a partial or complete sterilization, followed by evacuation and/or by substitution of the atmosphere above the surface of the milk in the can.

It is also found desirable to prevent any direct contact between the metal of the can and the milk and this may most desirably be accomplished by applying to the interior of the can a suitable non-metallic liner material which will substantially enclose the entire interior of the can.

Although it is possible to use paper liners inside of the can which may be varnished or lacquered, it has been found most suitable according to one embodiment of the present invention to coat the entire interior of the can with a cellulose acetate containing plastic material which may be applied in the form of an organic solvent solution, which acetate may suitably contain finely divided inert powdered or pulverized materials.

For example, it has been found particularly satisfactory to apply cellulose acetate coatings, which contain finely divided starch, silica or even other flour, since this gives body to the lining.

It has also been found desirable to use in connection with such cellulose acetate coating, a coat of a waxy material such as paraffin or a glyceride or vegetable wax, as the case may be.

In connection with milk which is placed in cans, it is also possible to cause the butter fat content of such milk to be substantially non-separating and to cause a thorough homogenization of the butter fat content throughout the body of the milk, since this apparently puts the milk in much more stable condition and retards or eliminates any tendency for the milk to become of lowered quality.

Referring to the drawing which illustrates several of the various possible embodiments of the present invention, but to which the present invention is by no means restricted, since the drawing is merely by way of illustration and not by way of limitation, Fig. 1 is a top perspective view of a can made according to the present invention, Figs. 2 and 3 are transverse sectional views upon the lines 2—2 and 3—3 of Fig. 1, upon an enlarged scale as compared to Fig. 1, Fig. 4 is a perspective view of the covering element of paper or metal, before being applied to the can of Figs. 1 to 3, Fig. 5 is a top perspective view of the can of Fig. 1 showing it before the device of Fig. 4 has been applied, Fig. 6 is a fragmentary view of an alternative embodiment showing the top of the can with a slightly different closure in position, and Figs. 7 and 8 are fragmentary side sectional views upon the lines 7—7 and 8—8 of Fig. 6.

Referring particularly to Figs. 1 to 3, the can has the cylindrical side walls 10, with the top 11 and a bottom 12, the capacity of the can being such as to hold a quart or pint of fresh whole milk.

The top of the can, as shown best in Fig. 2, is turned over at 13 to form a downwardly depending flange 14, inside of which is turned the edge 15 of the bead 16 of the flanged edge portion 17 of the cover 11.

The removable portion of the cover 18, which is shown as of triangular or wedge shape, but which may also be of circular or square shape, has a base 19 (see particularly Figs. 2 and 3) with the side flanges 20 and the end circular flange 21. The side flanges 20 contact with flanges 22 turned up from the cover 11 and have portions 23 which fit over and closely contact said upturned flanges 22.

At the wall, the overturned portion 24 of the can wall is pressed flat against the side of the can and the flange 21 has an overturned portion 25, a downturned portion 26 and an inturned portion 27, which fits below the downturned portion 24.

If desired, the cover may have the base, as shown in Fig. 4, with the flanged portions 26 and 27 extending outwardly as indicated before application to the can and binding of the flange 26—27.

Then this cover may be applied in such a way that the edges 23 of the flange 20 will overlap the upturned edges 22 extending upwardly from the base of the cover 11 and then the edge or flange 26—27 may be pressed down into position, in the manner indicated at the right of Fig. 2.

If desired, the cover elements of Fig. 4 may also be utilized as temporary covers. After the can of Fig. 5 has been filled, the metal cover element of Fig. 4 may be readily applied and sealed in position by rolling around the edges 20 and 21 without applying solder or welding, and with assurance that the milk will be maintained free of contamination and hermetically sealed.

The cover element 18 of Fig. 4 after attachment may be readily detached by applying a tool, such as a knife or other suitable device to the edge 28, preferably adjacent the corner 29 of said cover 18.

As indicated at the left-hand corner of Fig. 2, the walls 10 and the cover 11 may be coated or lined by an insulating or protective material or varnish 30, preferably including a laminated cellulose acetate-paraffin structure, or it may even consist or include resins, or other plastic materials. For certain purposes vinylite resins have been found to form a very satisfactory interior surfacing of the can.

It is most important in making up these lacquer compositions thoroughly to dry the lacquer composition before the milk is poured in and preferably coat the lacquer composition with a paraffin film and preferably eliminate any possible solvent or ingredient which tends to blend with or mix with the butter fat dispersed in the whole milk or in the cream if the can be used for such purpose.

In the embodiment of Figs. 6 to 8 is shown a triangular paper insert. In this case the walls 31 of the can are provided with a cover 32 which is downturned at 33 to form the outwardly bulged flange 34 and the underturned portion 35. The portion 36 of the can wall is provided with a bead 37 and a groove 38, said groove 38 and said bulge 34 receiving the insert 39.

The ledge 35 preferably extends along the edges 40 of the opening up to the side wall 31 and preferably the inner corner, as indicated at 41, is rounded.

The cover may be provided with a tongue 42, which may be readily lifted to permit removal of the paper triangle, which may be of compressed paper stock or even formed of a laminated resin or lacquer impregnated material.

It is thus apparent the present applicant has provided a novel process and apparatus for canning whole milk, which offers complete protection of the milk against contamination with bacterial and other micro-organisms by the container or through contact with external edges during handling or storage of the milk.

The container is inexpensive, may be readily handled and shipped and will save freight, rewashing, bulky packaging, refrigeration and so forth.

Moreover it is unbreakable and the milk when placed therein will be maintained in sterilized condition.

Many other changes could be effected in the particular features of methods and apparatus for canning whole milk disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. A can having vertical sheet metal side walls, top and bottom sheet metal walls, said top wall having a wedge shaped opening receiving a readily removable closure, said opening being widest toward the outside of the can and converging toward the central vertical axis of the can, said opening and closure being wedge shaped, a portion of the side wall of the can defining the base of said opening, the sides of the wedge-shaped opening in the can top wall having inturned portions forming a recess to receive the side edges of the closure and the base of the wedge in the can consisting of a groove in the side wall to receive the base of the closure.

2. The can of claim 1, in which the inturned portions have lips extending toward the center of the wedge to form a base for the closure, said closure being formed of a stiff paper.

REBECCA BECKER.